J. A. CALDWELL.
ENAMELED OR GRANITE WARE COOKING UTENSIL.
APPLICATION FILED OCT. 16, 1917.
1,308,622.
Patented July 1, 1919.
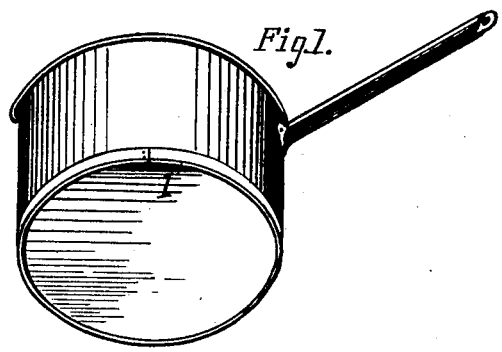
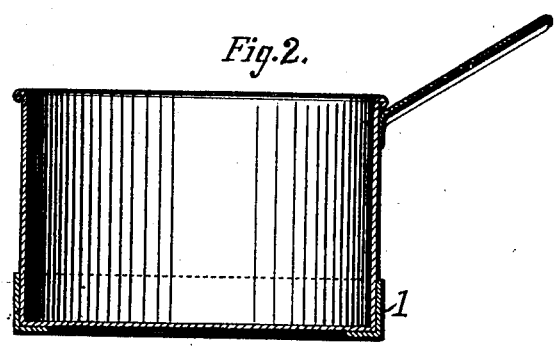
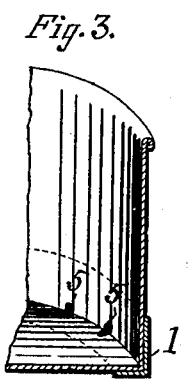
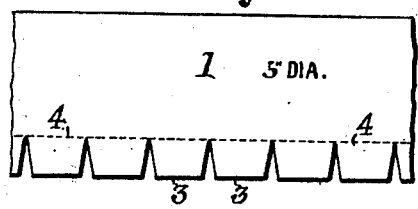
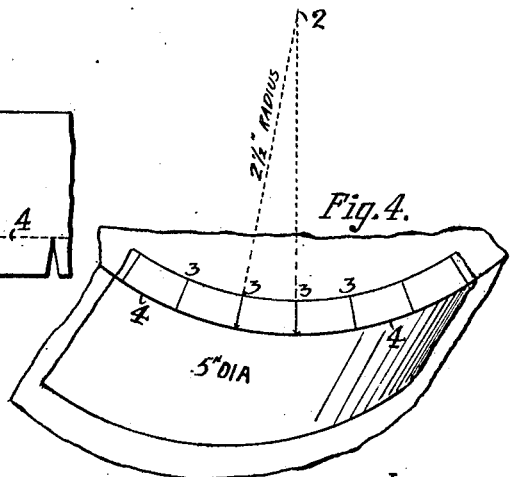
Inventor.
John A. Caldwell.

UNITED STATES PATENT OFFICE.

JOHN A. CALDWELL, OF VANCOUVER, BRITISH COLUMBIA, CANADA.

ENAMELED OR GRANITE WARE COOKING UTENSIL.

1,308,622.

Specification of Letters Patent.

Patented July 1, 1919.

Application filed October 16, 1917. Serial No. 196,912.

*To all whom it may concern:*

Be it known that I, JOHN A. CALDWELL, a citizen of the Dominion of Canada, residing at Vancouver, in the Province of British Columbia, Canada, have invented new and useful Improvements in Enameled or Granite Cooking Vessels or Saucepans, of which the following is a specification.

This invention relates to enameled or granite ware for cooking purposes by which those vessels may be rendered more sanitary by preventing them from being chipped around the bottom corners, and also provides an easy and cheap means of repairing such vessels as have been already chipped and with holes rusted in the bottom corners.

I attain these objects by means illustrated in the accompanying drawings, in which—

Figure 1 is a perspective view of an enameled vessel with my device applied to the bottom corner.

Fig. 2, is a vertical section of Fig. 1, on a slightly larger scale.

Fig. 3, a part section in perspective showing how the protecting ring is used to effect a repair.

Fig. 4, is a perspective view showing the manner of getting the form of the infold correctly for a certain sized pan or vessel, so that the edges of the tongues will be in contact when applied, and Fig. 5, shows a part of the ring forming strip as cut to form the tongues that lap over on the bottom.

Similar numerals refer to similar parts throughout the several views.

In these drawings 1 represents the protecting ring, and at 2, Fig. 4, is indicated the center of part of the bottom of a vessel from which the line 4, 4 the circumference of the vessel is described. 3, 3, 3, 3, indicate the lap or infold of the ring on the bottom of the vessel. The dotted lines from center 2 to 4, 4 give the spacing and shape of the tongues to contact, when bent inward on the bottom of the vessel.

If a strip of sheet metal, preferably galvanized sheet iron, about one and one-half inches wide, as shown at 1, Fig. 5, is taken, a little longer than the circumference of the vessel to be protected or repaired, and a line gaged along the strip about one-half inch in on one edge, corresponding to the lap over on the bottom, and spaced off as at 4, 4 and 3, 3, 3, Fig. 4 and Fig. 5, the angular notches cut or punched out, the strip then bent and formed into a ring, a little less than the circumference of the vessel, and the ends fastened, the tongues 3, 3, 3, 3 may then be bent inward of the ring, along the line 4, 4, and to a right angle to the wall of the ring. The protecting ring may then be pressed tightly onto the bottom corner of the vessel, and thus afford complete protection to the enamel, also a cheap and easy means to repair such vessels.

The bottom corner of a sauce pan is exposed to injury by blows that will chip and loosen the enamel and where the metal of the pan is so exposed will soon rust into holes rendering the vessel useless owing to the difficulty of repairing enamelware. This difficulty is overcome by the use of my invention as shown at Fig. 3, with part of the protecting ring 1 applied. 5 indicates the repairs consisting of a drop of solder in the hole which will adhere to the galvanized coating of the ring and if the solder is left full on the inside it may be lightly riveted and so seal the hole effectively.

Having thus described my invention, I hereby declare that what I claim as new, and desire to secure by Letters Patent is—

1. The combination with an enameled cooking vessel or the like, the side of which is integral with the bottom, a removable attached protecting ring of sheet metal, around the bottom outside corner, and conforming to the outside wall of the vessel, the said ring having a narrow portion of the bottom edge turned inwardly, in contact and in a plane with the bottom of the vessel, thus forming a cushion and protection for the enamel on the bottom corner of the vessel, all as shown and described.

2. The combination with an enameled cooking vessel or the like, the side of which is integral with the bottom, a removable attached protecting ring of sheet metal, around the bottom outside corner, and conforming to the outside wall of the vessel, one edge of the said ring, having short narrow tongues bent inward, in a plane and in contact with the vessel's bottom, the said tongues, being formed radial to the center of the bottom of the vessel, and of such width, that their radial edges will contact, and thus form a continuous ring, under and around the bottom corner of the vessel, and by so doing, afford an effective protecting buffer, or cushion to the enamel, all as shown and described.

3. To be used in combination with enameled cooking vessels or the like, the sides of which are integral with the bottoms, and of different diameters, a flat strip of galvanized sheet metal, having the specified diameter of a vessel stamped on it, and with a series of short tongues, formed along a line parallel to one edge, the edges of the tongues being cut radial to the center, as to the diameter stamped on the strip, and in contact with each other, along the said line, so that when the strip is formed into a ring, to fit tight, around the bottom outside corner of the vessel of that diameter, and the tongues bent inward, in contact and in a plane with the bottom of such vessel, the tongues will form a continuous ring for repair, and protection to the corner, all as shown and described.

In testimony whereof I affix my signature.

JOHN A. CALDWELL.

Copies of this patent may be obtained for five cents each, by addressing the "Commissioner of Patents, Washington, D. C."